United States Patent
Blake et al.

(10) Patent No.: US 12,520,829 B2
(45) Date of Patent: *Jan. 13, 2026

(54) TRANSGENIC CORY

(71) Applicant: GloFish, LLC, Earth City, MO (US)

(72) Inventors: Alan Blake, Austin, TX (US); Richard Crockett, Wilton, CT (US); Aidas Nasevicius, Tampa, FL (US)

(73) Assignee: GloFish, LLC., Earth City, MO (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/259,828

(22) PCT Filed: Jan. 12, 2022

(86) PCT No.: PCT/US2022/012158
§ 371 (c)(1),
(2) Date: Jun. 29, 2023

(87) PCT Pub. No.: WO2022/155230
PCT Pub. Date: Jul. 21, 2022

(65) Prior Publication Data
US 2024/0315218 A1    Sep. 26, 2024

Related U.S. Application Data

(60) Provisional application No. 63/136,464, filed on Jan. 12, 2021, provisional application No. 63/136,454, filed on Jan. 12, 2021, provisional application No. 63/136,460, filed on Jan. 12, 2021.

(51) Int. Cl.
*A01K 67/0275* (2024.01)
(52) U.S. Cl.
CPC .... *A01K 67/0275* (2013.01); *A01K 2217/052* (2013.01); *A01K 2227/40* (2013.01); *A01K 2267/01* (2013.01)
(58) Field of Classification Search
None
See application file for complete search history.

(56) References Cited

U.S. PATENT DOCUMENTS

| | | | |
|---|---|---|---|
| 7,135,613 B1 | 11/2006 | Gong et al. | |
| 7,700,825 B2 | 4/2010 | Blake et al. | |
| 7,834,239 B2 | 11/2010 | Gong et al. | |
| 8,975,467 B2 | 3/2015 | Blake et al. | |
| 9,968,077 B2 | 5/2018 | Blake et al. | |
| 2002/0178461 A1 | 11/2002 | Lin | |
| 2004/0143864 A1 | 7/2004 | Gong et al. | |
| 2005/0198701 A1 | 9/2005 | Lian et al. | |
| 2009/0025645 A1 | 1/2009 | Blake et al. | |
| 2010/0037330 A1 | 2/2010 | Siripattarapravat et al. | |
| 2012/0210453 A1 | 8/2012 | Blake et al. | |
| 2014/0130195 A1 | 5/2014 | Blake et al. | |
| 2015/0216151 A1 | 8/2015 | Blake et al. | |
| 2016/0128310 A1 | 5/2016 | Blake et al. | |
| 2017/0258057 A1 | 9/2017 | Blake et al. | |
| 2018/0064074 A1 | 3/2018 | Gong et al. | |
| 2018/0064075 A1* | 3/2018 | Blake | A01K 67/027 |
| 2018/0077909 A1 | 3/2018 | Endo et al. | |
| 2020/0323181 A1 | 10/2020 | Blake et al. | |

FOREIGN PATENT DOCUMENTS

| | | |
|---|---|---|
| CN | 103540611 A | 1/2014 |
| CN | 106070063 A | 11/2016 |
| WO | 2020/102333 A1 | 5/2020 |

OTHER PUBLICATIONS

Brem, 1988, Gene transfer in Tilapia (*Oreochromis nilotics*), Aquaculture, 68:209-219.
Chourrout, 1986, High efficiency gene transfer in rainbow trout, *Salmo gairdneri* Rich.) by microinjection into egg cytoplasm, Aquaculture, 51:143-150.
Devlin, 1994, Extraordinary salmon growth, Scientific Correspondence, Nature, 371:209-210.
Draper, 2009, A High-Throughput Method for Zebrafish Sperm Cryopreservation and In Vitro Fertilization, Journal of Visualized Experiments, Jove, 29, e1395:1-5.
Du, 1992, Growth enhancement in transgenic atlantic salmon by the use of an "All Fish" Chimeric growth hormone gene contrust, Bio/Technology, Nature Publishing Group, 10:176-181.
European Exam Report issued in European Application No. 22739996.1, date of mailing: Dec. 11, 2024, 11 pages.
Gross, 1992, Molecular analysis and growth evaluation of northern pike (*Esox lucius*) microinjected with growth hormone genes, Aquaculture, 103:253-273.
Khoo, 1992, Sperm cells as vectors for introducing foregin DNA into ebrafish, Aquaculture, 107(1):1-19.
Penman, 1990, Factors Affecting Survival and Integration Following Microinjection of Novel DNA into Rainbow Trout Eggs, Aquaculture, 85:35-50.
Shagin, 2004, GFP-like Proteins as Ubiquitous Metazoan Superfamily: Evolution of Functional Features and Structural Complexity, Molecular Biology and Evolution, 21(5):841-850.
Sin, 1993, Gene transer in chinook salmon (*Oncorhynchus tshawytscha*) by electroporating sperm in the presence of pRSV-lacZ DNA, Aquaculture, 117:57-69.
Szelei, 1994, Liposome-mediated gene transfer in fish embryos, Transgenic Research, 3:116-119.
Tsai, 1995, Electroporation of sperm to introduce foreign DNA into the genome of loach (*Misgurnus anguuillicauatus*): Can J Fish Aquat Sci, 52:776-787.
Walker, 2016, Freezing Sperm in Zebrafish Book—A guide for the Laboratory Use of Zebrafish (*Danio rerio*) 4th Edition ZFIN: Breeding Zebrafish, University of Oregon, 8 pages.

(Continued)

*Primary Examiner* — Anoop K Singh
(74) *Attorney, Agent, or Firm* — Brown Rudnick LLP; Ryan C. Smith

(57) ABSTRACT

The present invention relates to transgenic ornamental fish, as well as methods of making such fish by germ cell transplantation techniques. Also disclosed are methods of establishing a population of such transgenic fish and methods of providing them to the ornamental fish industry for the purpose of marketing.

6 Claims, No Drawings

(56) References Cited

OTHER PUBLICATIONS

Wikipedia: GloFish: Difference between revisions, [retrieved from the internet on Dec. 19, 2020] <https://en.wikipedia.org/w/index.php?title+GloFish&diff=prev&old=995151455, 8 pages.

Xu, 1999, Fast Skeletal Muscle-Specific Expression of a Zebrafish Myosin Light Chain 2 Gene and Characterization of Its Promoter by Direct Injection into Skeletal Muscle, DNA and Cell Biology, 18:85-95.

Yoshizaki, 2018, Production of live fish derived from frozen germ cells via germ cell transplantation, Stem Cell Research, 29:103-110.

Zelenin, 1991, The delivery of foreign genes into fertilized fish eggs using high-velocity microprojectiles, FEBS Lett, 287(1-2):118-120.

Zhu, 1985, Novel gene transfer into the fertilized eggs of gold fish (*Carassius auratus* L. 1758), Institute if Hydrobiology, Academia Sinica, Wuhan, P.R. China.

\* cited by examiner

TRANSGENIC CORY

CROSS REFERENCE TO RELATED APPLICATIONS

Priority

This application is a United States national stage application and claims priority to a PCT International Application filed on Jan. 11, 2022 and claims priority to and the benefit of U.S. Provisional Patent Application Nos. 63/136,454, 63/136,460 and 63/136,464, all filed on Jan. 12, 2021, the entire contents of each of which are incorporated by reference herein.

FIELD OF THE INVENTION

This invention relates to transgenic fish, particularly red, pink, orange, green and yellow transgenic Cory.

INTRODUCTION

Transgenic technology involves the transfer of a foreign gene into a host organism enabling the host to acquire a new and inheritable trait. Transgenic technology has many potential applications. For example, it can be used to introduce a transgene into a fish in order to create new varieties of fish. There are many ways of introducing a foreign gene into fish, including: microinjection (e.g., Zhu et al., 1985; Du et al., 1992), electroporation (Powers et al., 1992), sperm-mediated gene transfer (Khoo et al., 1992; Sin et al., 1993), gene bombardment or gene gun (Zelenin et al., 1991), liposome-mediated gene transfer (Szelei et al., 1994), and the direct injection of DNA into muscle tissue (Xu et al., 1999).

The first transgenic fish report was published by Zhu et al., (1985) using a chimeric gene construct consisting of a mouse metallothionein gene promoter and a human growth hormone gene. Most of the early transgenic fish studies have concentrated on growth hormone gene transfer with an aim of generating fast growing fish. While a majority of early attempts used heterologous growth hormone genes and promoters and failed to produce these fish (e.g. Chourrout et al., 1986; Penman et al., 1990; Brem et al., 1988; Gross et al., 1992), enhanced growth of transgenic fish has been demonstrated in several fish species including Atlantic salmon, several species of Pacific salmons, and loach (e.g. Du et al., 1992; Delvin et al., 1994, 1995; Tsai et al., 1995).

*Corydoras* (Cory) is a genus of freshwater catfish in the family *Callichthyidae* and subfamily *Corydoradinae*. Species assigned to *Corydoras* display a broad diversity of body coloration. The genus is well known among aquarists for its many species. They are well suited to tropical freshwater community aquariums, as they get along well with other species and are not at all aggressive. However, for the ornamental fish industry, the bronze, albino or black body does not aid in the efficient display of the various colors. The availability of such Corys having modified pigmentation for transgenesis with fluorescent proteins would result in better products for the ornamental fish industry due to better visualization of the various colors.

Many fluorescent proteins are known in the art and have been used to investigate various cellular processes, including fluorescent proteins exhibiting various green, red, pink, yellow, orange, blue, or purple colors. Although transgenic experiments involving fluorescent proteins have provided new markers and reporters for transgenesis, progress in the field of developing and producing Corys that express such proteins has been limited.

Transgenic Cory

In certain embodiments, the present disclosure concerns making transgenic fluorescent fish and providing such fish to the ornamental fish industry.

In some embodiments, transgenic fish or methods of making transgenic fish are provided. In certain aspects, the transgenic fish are fertile, transgenic, fluorescent fish. In a particular embodiment, the fish for use with the disclosed constructs and methods is the Cory. Cory skin color is determined by pigment cells in the skin, which contain pigment granules called melanosomes (black or brown color), xanthosomes (yellow color), erythrosomes (orange or red color), or iridosomes (iridescent colors, including white color). The number, size, and density of the pigment granules per pigment cell influence the color of the fish skin.

In certain specific embodiments, there are provided transgenic Cory or progeny thereof comprising specific transgenic integration events, referred to herein as transformation events. These fish are of particular interest because, for example, they embody an aesthetically pleasing Red color. Transgenic fish comprising these specific transgenic events may be homozygous or heterozygous (including, for example, hemizygous) for the transformation event. Homozygous fish bred with fish lacking a transformation event will in nearly all cases produce 100% heterozygous offspring. Germ cells, eggs, sperm, and embryos comprising these specific transgenic events are also included as part of the invention.

In one such embodiment regarding a specific transgenic integration event, a red transgenic Cory or progeny thereof is provided comprising chromosomally integrated transgenes, wherein the Cory comprises the "Red Cory 1 transformation event," cryopreserved adult germ stem cells comprising the Red Cory 1 transformation event having been deposited as ATCC accession no. PTA-127094. The chromosomally integrated transgenes may be present on one integrated expression cassette or two or more integrated expression cassettes. In certain aspects, such a transgenic Cory is a fertile, transgenic Cory. Such a transgenic Cory may be homozygous or heterozygous (including, for example, hemizygous) for the transgenes or integrated expression cassette(s).

Also disclosed are methods of providing a transgenic Cory comprising the Red Cory 1 transformation event to the ornamental fish market. In some embodiments, the method comprises obtaining a transgenic Cory or progeny thereof comprising chromosomally integrated transgenes, wherein the Cory comprises the "Red Cory 1 transformation event," cryopreserved adult germ stem cells comprising the Red Cory 1 transformation event having been deposited as ATCC accession no. PTA-127094, and distributing the fish to the ornamental fish market. Such fish may be distributed by a grower to a commercial distributor, or such fish may be distributed by a grower or a commercial distributor to a retailer such as, for example, a multi-product retailer having an ornamental fish department.

In some aspects, methods of producing a transgenic Cory are provided comprising: (a) obtaining a Cory that exhibits fluorescence and comprises one or more chromosomally integrated transgenes or expression cassettes, wherein the Cory comprises the "Red Cory 1 transformation event," cryopreserved adult germ stem cells comprising the Red Cory 1 transformation event having been deposited as ATCC accession no. PTA-127094; and (b) breeding the obtained Cory with a second Cory to provide a transgenic Cory comprising the Red Cory 1 transformation event. The second Cory may be a transgenic or non-transgenic Cory.

In further embodiments, also provided are methods of producing a transgenic organism, the method comprising using germ cell transplantation to produce the Red Cory 1 transformation, such cryopreserved adult germ stem cells having been deposited as ATCC accession no. PTA-127094, to produce transgenic offspring. Such offspring may be, for example, a Cory, a species of the *Corydoras* family, a fish species or genus related to Cory, or another fish species or genus.

In another embodiment regarding a specific transgenic integration event, an orange transgenic Cory or progeny thereof is provided comprising chromosomally integrated transgenes, wherein the Cory comprises the "Orange Cory 1 transformation event," cryopreserved adult germ stem cells comprising the Orange Cory 1 transformation event having been deposited as ATCC accession no. PTA-127095. The chromosomally integrated transgenes may be present on one integrated expression cassette or two or more integrated expression cassettes. In certain aspects, such a transgenic Cory is a fertile, transgenic Cory. Such a transgenic Cory may be homozygous or heterozygous (including, for example, hemizygous) for the transgenes or integrated expression cassette(s).

Also disclosed are methods of providing a transgenic Cory comprising the Orange Cory 1 transformation event to the ornamental fish market. In some embodiments, the method comprises obtaining a transgenic Cory or progeny thereof comprising chromosomally integrated transgenes, wherein the Cory comprises the "Orange Cory 1 transformation event," cryopreserved adult germ stem cells comprising the Orange Cory 1 transformation event having been deposited as ATCC accession no. PTA-127095, and distributing the fish to the ornamental fish market. Such fish may be distributed by a grower to a commercial distributor, or such fish may be distributed by a grower or a commercial distributor to a retailer such as, for example, a multi-product retailer having an ornamental fish department.

In some aspects, methods of producing a transgenic Cory are provided comprising: (a) obtaining a Cory that exhibits fluorescence and comprises one or more chromosomally integrated transgenes or expression cassettes, wherein the Cory comprises the "Orange Cory 1 transformation event," cryopreserved adult germ stem cells comprising the Orange Cory 1 transformation event having been deposited as ATCC accession no. PTA-127095; and (b) breeding the obtained Cory with a second Cory to provide a transgenic Cory comprising the Orange Cory 1 transformation event. The second Cory may be a transgenic or non-transgenic Cory.

In further embodiments, also provided are methods of producing a transgenic organism, the method comprising using germ cell transplantation to produce the Orange Cory 1 transformation, such cryopreserved adult germ stem cells having been deposited as ATCC accession no. PTA-127095, to produce transgenic offspring. Such offspring may be, for example, a Cory, a species of the *Corydoras* family, a fish species or genus related to Cory, or another fish species or genus.

In another embodiment regarding a specific transgenic integration event, a green transgenic Cory or progeny thereof is provided comprising chromosomally integrated transgenes, wherein the Cory comprises the "Green Cory 1 transformation event," cryopreserved adult germ stem cells comprising the Green Cory 1 transformation event having been deposited as ATCC accession no. PTA-127096. The chromosomally integrated transgenes may be present on one integrated expression cassette or two or more integrated expression cassettes. In certain aspects, such a transgenic Cory is a fertile, transgenic Cory. Such a transgenic Cory may be homozygous or heterozygous (including, for example, hemizygous) for the transgenes or integrated expression cassette(s).

Also disclosed are methods of providing a transgenic Cory comprising the Green Cory 1 transformation event to the ornamental fish market. In some embodiments, the method comprises obtaining a transgenic Cory or progeny thereof comprising chromosomally integrated transgenes, wherein the Cory comprises the "Green Cory 1 transformation event," cryopreserved adult germ stem cells comprising the Green Cory 1 transformation event having been deposited as ATCC accession no. PTA-127096, and distributing the fish to the ornamental fish market. Such fish may be distributed by a grower to a commercial distributor, or such fish may be distributed by a grower or a commercial distributor to a retailer such as, for example, a multi-product retailer having an ornamental fish department.

In some aspects, methods of producing a transgenic Cory are provided comprising: (a) obtaining a Cory that exhibits fluorescence and comprises one or more chromosomally integrated transgenes or expression cassettes, wherein the Cory comprises the "Green Cory 1 transformation event," cryopreserved adult germ stem cells comprising the Green Cory 1 transformation event having been deposited as ATCC accession no. PTA-127096; and (b) breeding the obtained Cory with a second Cory to provide a transgenic Cory comprising the Green Cory 1 transformation event. The second Cory may be a transgenic or non-transgenic Cory.

In further embodiments, also provided are methods of producing a transgenic organism, the method comprising using germ cell transplantation to produce the Green Cory 1 transformation, such cryopreserved adult germ stem cells having been deposited as ATCC accession no. PTA-127096, to produce transgenic offspring. Such offspring may be, for example, a Cory, a species of the *Corydoras* family, a fish species or genus related to Cory, or another fish species or genus.

In further embodiments, yellow cory comprise 2 expression cassettes. Both cassettes can be homozygous. In other embodiments, each of the cassettes can be heterozygous. In alternative embodiments one expression cassette can be homozygous and the other expression cassette is heterozygous. It should be appreciated that fish of different zygosities will produce different ratios of offspring when bred.

In at least one example embodiment, a cory will comprise a specific transgenic integration event, a yellow transgenic cory or progeny thereof is provided comprising chromosomally integrated transgenes. The chromosomally integrated transgenes comprise a chromosomally integrated expression cassette encoding a green fluorescent protein and a chromosomally integrated expression cassette encoding orange fluorescent protein.

In some example embodiments, the yellow cory will comprise a green fluorescent protein, or a portion thereof and/or an orange fluorescent protein or a portion thereof. In at least these example embodiments, a transgenic cory is a fertile, transgenic cory. Such a transgenic cory may be homozygous or heterozygous (including, for example, hemizygous) for the transgenes or integrated expression cassette(s).

The chromosomally integrated transgenes may be present on one integrated expression cassette or two or more integrated expression cassettes. In some example embodiments, the yellow cory will comprise a green fluorescent protein, or a portion thereof and an orange fluorescent protein, or a portion thereof. In at least these example embodiments, a transgenic green cory is a fertile, transgenic cory and is crossed with a transgenic orange cory which is a fertile, transgenic cory. In more specific aspects, the progeny of such a cross is a transgenic yellow cory. In at least these example embodiments, such a transgenic cory may be homozygous or heterozygous (including, for example, hemizygous) for the transgenes or integrated expression cassette(s).

Also disclosed are methods of providing a transgenic cory comprising a yellow cory to the ornamental fish market. In some embodiments, the method comprises obtaining a transgenic cory or progeny thereof comprising chromosomally integrated transgenes and distributing the fish to the ornamental fish market. Such fish may be distributed by a grower to a commercial distributor, or such fish may be distributed by a grower or a commercial distributor to a retailer such as, for example, a multi-product retailer having an ornamental fish department.

In some aspects, methods of producing a transgenic cory are provided comprising: (a) obtaining a cory that exhibits fluorescence and comprises one or more chromosomally integrated transgenes or expression cassettes; and (b) breeding the obtained cory with a second cory to provide a transgenic cory. The second cory may be a transgenic or non-transgenic cory. In further embodiments, also provided are methods of producing a transgenic organism, the method comprising using a yellow cory to produce transgenic offspring. Such offspring may be, for example, a cory, a fish species or genus related to cory, or another fish species or genus.

As used in this specification, "a" or "an" may mean one or more. As used herein in the claim(s), when used in conjunction with the word "comprising," the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

Throughout this application, the term "about" is used to indicate that a value includes the inherent variation of error for the device, the method being employed to determine the value, or the variation that exists among the study subjects.

Any embodiment of any of the present methods, kits, and compositions may consist of or consist essentially of— rather than comprise/include/contain/have—the described features and/or steps. Thus, in any of the claims, the term "consisting of" or "consisting essentially of" may be substituted for any of the open-ended linking verbs recited above, in order to change the scope of a given claim from what it would otherwise be using the open-ended linking verb.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION

Transgenic Fish

In some aspects, the present disclosure regards transgenic fish. Methods of making transgenic fish are described in, for example, U.S. Pat. Nos. 7,135,613; 7,700,825; 7,834,239, each of which is incorporated by reference in its entirety. For example, a transgenic red Cory may be generated using an expression cassette encoding Red fluorescent protein (RFP), such as TurboRFP, DsRed2, tdTomato, dTomato, eqFP578, DsRed-Express, DsRed-Express2, TagRFP, TagRFP-T, RRvT, cgfTagRFP, mApple, mRuby3, mNectarine, meffRFP, mScarlet-I, and amilFP593. A transgenic orange Cory may be generated using an expression cassette encoding yellow fluorescent protein (YFP), such as ZsYellow1, TurboYFP, E2-Orange, phiYFP, zFP538, Venus, yPet, cca-lYFP1, mGold, Citrine, mCitrine, Topaz, mPapaya, and mBanana. A transgenic green Cory may be generated using an expression cassette encoding Green fluorescent protein (GFP), such as zsGreen1, eYGFPdp, AausFP1, mNeonGreen, maxNeonGreen, mGreenLantern, Clover, mClover3, PlamGFP, aeurGFP, afraGFP, WasCFP, NowGFP, cerFP505, pporGFP, Kohinoor, efasGFP, eechGFP1, bfloGFPal, LanFP1 and LanFP2. A transgenic yellow Cory may be generated using an expression cassette encoding Green fluorescent protein (GFP), such as zsGreen 1 and yellow fluorescent protein (YFP), such as ZsYellow1.

It is preferred that fish belonging to species and varieties of fish of commercial value, particularly commercial value within the ornamental fish industry, be used. Such fish include but are not limited to cory, catfish, zebrafish and other danios, medaka, carp, tilapia, goldfish, tetras, barbs, sharks (family cyprinidae, such as rainbow shark), angelfish, loach, koi, glassfish, discus, eel, goby, gourami, guppy, Xiphophorus, hatchet fish, Molly fish, or pangasius. A particular fish for use in the context of the present disclosure is a Cory. Corys are increasingly popular ornamental animals and would be of added commercial value in various colors. Cory embryos are easily accessible. Cory skin color is determined by pigment cells in the skin, which contain pigment granules called melanosomes. The number, size, and density of the melanosomes per pigment cell influence the color of the fish skin.

In commercial aquaculture, Corys are spawned naturally. In one example embodiment a group of females and males are placed in a vat where PVC tiles are hung from vat sides as spawning media. The tiles with deposited eggs are collected, transferred into aquaria and incubated at 74-82 degrees Fahrenheit until the fry hatch (i.e. about 3 to 5 days). At this time the tiles are removed. The fry are fed freshly hatched Artemia nauplii for approximately 2 weeks. At this time the fry can be safely handled and can be transferred into grow-out vats or outside earthen ponds. It takes about six months for cory to mature. In a related embodiment, line propagation is maintained by cryopreserved testes.

Germ Cell Transplantation

Fish gonad freezing methods are well-known in the art; see, e.g., Lee et al. (2013), and Seki et al. (2017), both of which are incorporated herein by reference in their entireties. To obtain the transgenic fish disclosed herein, germ cells obtained from dissociated frozen Cory gonads may be used.

In an example embodiment, young not quite mature female Corys are euthanized using an overdose of sedative, such as Tricaine, followed by brain destruction using scissors. The fish are blotted dry, dissected and their ovaries are removed and transferred into ice-cold L-15 medium. Ideally, the collected tissue should have no or very few mature oocytes. When the desired amount of tissue is obtained, the ovaries are macerated using scissors into approximately 1-2 mm fragments. The tissue fragments are allowed to settle, the L-15 medium is removed, and 0.25% of Trypsin in 1×PBS with 2 U/ml of DNaseI is added to the tissue-approximately 1 ml of the solution for tissue collected from 4-5 fish. The tissue is incubated on ice for 30 minutes, mixing every 10 minutes. After, the tissue is transferred to room temperature and is incubated for 1 hour, gently triturating every 5 minutes. After the incubation, the obtained cell suspension with remaining tissue fragments is filtered through 40-micron sieve. The retained tissue is rinsed with L-15 medium, filtered and combined with the previously obtained filtrate. The filtrate is overlayed on top of 40% Percoll made with Opti-MEM medium and is centrifuged in a swinging rotor for 15 minutes at 1500 RPM at 10 degrees C. The interphase is collected and double volume of L-15 medium is added. The suspension is centrifuged in a swinging rotor for 5 minutes at 1000 RPM at 10 degrees C. The supernatant is removed and discarded, the pellet is suspended in cold Opti-MEM medium. The suspension is kept on ice. To freeze the cells, transfer 100 µL of ice cold 1.8M DMSO in 1×HBSS to cryovial. Add 33 µL of the cell suspension, mix, and transfer the cryovial into iCellBox or a comparable cell freezing container for freezing rate of 1 degrees C. per minute. When the iCellBox is full, it is transferred into a cooler with dry ice and is left to freeze overnight or at least for 12 hours. After the freezing, the cryovials are transferred from iCellBox into liquid nitrogen for long-term storage.

In example method of recovering a red Cory line, where the cryopreserved cells are thawed by transferring a cryovial from liquid nitrogen into 10-15 degree C. water bath and incubating until the cell suspension thaws—approximately for 1 minute. 1 ml of ice cold Opti-MEM medium is added to the suspension, mixed, and centrifuged in a swinging rotor for 5 minutes at 1000 RPM at 10 degrees C. The supernatant except for 50 µL is removed and discarded, and 0.5 ml of Opti-MEM medium is added to the pellet. The pellet is suspended and the suspension is incubated at 30 degrees C. for 30 minutes. After the incubation, the suspension is centrifuged in a swinging rotor for 5 minutes at 1000 RPM at 10 degrees C. The supernatant except for 15 µL is removed and discarded and the cells are resuspended in the remaining supernatant. The cell suspension is then injected into 5-6 day old anesthetized with Tricaine Cory fry which were treated with primordazine B—approximately 100-200 nl of the suspension per fry. The injected fry are reared to adulthood and spawned using regular protocol to obtain red Cory progeny. To treat cory embryos with primordazine B, approximately 200-300 less than one-hour old cory eggs are removed from the tiles and transferred into a Petri dish with 40 ml of water suitable for fish. Primordazine B solution in DMSO is added to the final concentration of 5.5 µg/ml and mixed. The eggs are incubated in the solution for 24 hours at room temperature and then are transferred into a tank for hatching.

The present disclosure further encompasses progeny of a transgenic fish containing the Red Cory 1 transformation event, as well as such transgenic fish derived from a transgenic fish egg, sperm cell, embryo, or other cell containing a genomically integrated transgenic construct. "Progeny," as the term is used herein, can result from breeding two transgenic fish of the invention, or from breeding a first transgenic fish of the invention to a second fish that is not a transgenic fish of the invention. In the latter case, the second fish can, for example, be a wild-type fish, a specialized strain of fish, a mutant fish, or another transgenic fish. The second fish may be of the same species, or may be of a different species or genus. The hybrid progeny of these matings have the benefits of the transgene for fluorescence combined with the benefits derived from these other lineages.

The simplest way to identify fish containing the Red Cory 1 transformation event is by visual inspection, as the fish in question would be red colored and immediately distinguishable from non-transgenic fish. It should be appreciated that depending on the specific RFP used and/or the insertion location of the expression cassette, the transgenic red Cory may have a color that is maintained over the course of the life of the transgenic red Cory's life and/or throughout multiple generations. It should also be appreciated that depending on the specific RFP used and/or the insertion location of the expression cassette, the transgenic red Cory may have a color that fades over the course of the transgenic red Cory's life. For example, the red transgenic Cory may change in color from red to pale red, or from red to pink. In addition, depending on the specific RFP used and/or the insertion location of the expression cassette, the transgenic red Cory may have a color that fades over generations. For example, the red transgenic Cory may change in color from one generation to the next, such that an older generation may exhibit the red color, but a younger generation may appear pale red, or pink.

In example method of recovering an orange Cory line, where the cryopreserved cells are thawed by transferring a cryovial from liquid nitrogen into 10-15 degree C. water bath and incubating until the cell suspension thaws—approximately for 1 minute. 1 ml of ice cold Opti-MEM medium is added to the suspension, mixed, and centrifuged in a swinging rotor for 5 minutes at 1000 RPM at 10 degrees C. The supernatant except for 50 µL is removed and discarded, and 0.5 ml of Opti-MEM medium is added to the pellet. The pellet is suspended and the suspension is incubated at 30 degrees C. for 30 minutes. After the incubation, the suspension is centrifuged in a 15 µL is removed and discarded and the cells are resuspended in the remaining supernatant. The cell suspension is then injected into 5-6 day old anesthetized with Tricaine Cory fry which were treated with primordazine B—approximately 100-200 nl of the suspension per fry. The injected fry are reared to adulthood and spawned using regular protocol to obtain orange Cory progeny. To treat cory embryos with primordazine B, approximately 200-300 less than one-hour old cory eggs are removed from the tiles and transferred into a Petri dish with 40 ml of water suitable for fish. Primordazine B solution in DMSO is added to the final concentration of 5.5 µg/ml and mixed. The eggs are incubated in the solution for 24 hours at room temperature and then are transferred into a tank for hatching.

The present disclosure further encompasses progeny of a transgenic fish containing the Orange Cory 1 transformation event, as well as such transgenic fish derived from a transgenic fish egg, sperm cell, embryo, or other cell containing a genomically integrated transgenic construct. "Progeny," as the term is used herein, can result from breeding two transgenic fish of the invention, or from breeding a first transgenic fish of the invention to a second fish that is not a transgenic fish of the invention. In the latter case, the second fish can, for example, be a wild-type fish, a specialized strain of fish, a mutant fish, or another transgenic fish. The second fish may be of the same species, or may be of a different species or genus. The hybrid progeny of these matings have the benefits of the transgene for fluorescence combined with the benefits derived from these other lineages.

The simplest way to identify fish containing the Orange Cory 1 transformation event is by visual inspection, as the fish in question would be orange colored and immediately distinguishable from non-transgenic fish.

In example method of recovering a green Cory line, where the cryopreserved cells are thawed by transferring a cryovial from liquid nitrogen into 10-15 degree C. water bath and incubating until the cell suspension thaws—approximately for 1 minute. 1 ml of ice cold Opti-MEM medium is added to the suspension, mixed, and centrifuged in a swinging rotor for 5 minutes at 1000 RPM at 10 degrees C. The supernatant except for 50 µL is removed and discarded, and 0.5 ml of Opti-MEM medium is added to the pellet. The pellet is suspended and the suspension is incubated at 30 degrees C. for 30 minutes. After the incubation, the suspension is centrifuged in a 15 µL is removed and discarded and the cells are resuspended in the remaining supernatant. The cell suspension is then injected into 5-6 day old anesthetized with Tricaine Cory fry which were treated with primordazine B—approximately 100-200 nl of the suspension per fry. The injected fry are reared to adulthood and spawned using regular protocol to obtain green Cory progeny. To treat cory embryos with primordazine B, approximately 200-300 less than one-hour old cory eggs are removed from the tiles and transferred into a Petri dish with 40 ml of water suitable for fish. Primordazine B solution in DMSO is added to the final concentration of 5.5 µg/ml and mixed. The eggs are incubated in the solution for 24 hours at room temperature and then are transferred into a tank for hatching.

The present disclosure further encompasses progeny of a transgenic fish containing the Green Cory 1 transformation event, as well as such transgenic fish derived from a transgenic fish egg, sperm cell, embryo, or other cell containing a genomically integrated transgenic construct. "Progeny," as the term is used herein, can result from breeding two transgenic fish of the invention, or from breeding a first transgenic fish of the invention to a second fish that is not a transgenic fish of the invention. In the latter case, the second fish can, for example, be a wild-type fish, a specialized strain of fish, a mutant fish, or another transgenic fish. The second fish may be of the same species, or may be of a different species or genus. The hybrid progeny of these matings have the benefits of the transgene for fluorescence combined with the benefits derived from these other lineages.

The simplest way to identify fish containing the Green Cory 1 transformation event is by visual inspection, as the fish in question would be green colored and immediately distinguishable from non-transgenic fish.

In example method of recovering a yellow Cory line, where the cryopreserved cells are thawed by transferring a cryovial from liquid nitrogen into 10-15 degree C. water bath and incubating until the cell suspension thaws—approximately for 1 minute. 1 ml of ice cold Opti-MEM medium is added to the suspension, mixed, and centrifuged in a swinging rotor for 5 minutes at 1000 RPM at 10 degrees C. The supernatant except for 50 µL is removed and discarded, and 0.5 ml of Opti-MEM medium is added to the pellet. The pellet is suspended and the suspension is incubated at 30 degrees C. for 30 minutes. After the incubation, the suspension is centrifuged in a 15 µL is removed and discarded and the cells are resuspended in the remaining supernatant. The cell suspension is then injected into 5-6 day old anesthetized with Tricaine Cory fry which were treated with primordazine B—approximately 100-200 nl of the suspension per fry. The injected fry are reared to adulthood and spawned using regular protocol to obtain yellow Cory progeny. To treat cory embryos with primordazine B, approximately 200-300 less than one-hour old cory eggs are removed from the tiles and transferred into a Petri dish with 40 ml of water suitable for fish. Primordazine B solution in DMSO is added to the final concentration of 5.5 µg/ml and mixed. The eggs are incubated in the solution for 24 hours at room temperature and then are transferred into a tank for hatching.

The present disclosure further encompasses progeny of a transgenic fish namely yellow transgenic cory, which comprise a Green Cory 1 transformation event and an Orange Cory 1 transformation event, as well as such transgenic fish derived from a transgenic fish egg, sperm cell, embryo, or other cell containing a genomically integrated transgenic constructs. "Progeny," as the term is used herein, can result from breeding two transgenic fish of the invention, or from breeding a first transgenic fish of the invention to a second fish that is not a transgenic fish of the invention. In the latter case, the second fish can, for example, be a wild-type fish, a specialized strain of fish, a mutant fish, or another transgenic fish. The second fish may be of the same species, or may be of a different species or genus. The hybrid progeny of these matings have the benefits of the transgene for fluorescence combined with the benefits derived from these other lineages.

The simplest way to identify yellow transgenic cory is by visual inspection, as the fish in question would be yellow colored and immediately distinguishable from non-transgenic fish.

EXAMPLES

Certain embodiments of the invention are further described with reference to the following examples. These examples are intended to be merely illustrative of the invention and are not intended to limit or restrict the scope of the present invention in any way and should not be construed as providing conditions, parameters, reagents, or starting materials that must be utilized exclusively in order to practice the art of the present invention.

Example 1—Red Transgenic Cory

Transgenic fish exhibiting a Red color are provided. The specific transgenic events embodied in these fish are designated the "Red Cory 1 transformation event". Germ cells from these fish may be implanted into Cory eggs and thereby obtain transgenic Cory that comprises the specific transgenic integration events. Cryopreserved adult germ stem cells from this line was deposited at the ATCC, Historic District, 10801 University Blvd, Manassas, VA 20110, under the provisions of the Budapest Treaty as "Red Cory 1" (the deposit was designated as accession no. PTA-127094).

The fluorescent transgenic fish have use as ornamental fish in the market. Stably expressing transgenic lines can be developed by breeding a transgenic individual with a wild-type fish, mutant fish, or another transgenic fish. The desired transgenic fish can be distinguished from non-transgenic fish by observing the fish in white light, sunlight, ultraviolet light, blue light, or any other useful lighting condition that allows visualization of the Red color of the transgenic fish.

Example 2—Orange Transgenic Cory

Transgenic fish exhibiting an Orange color are provided. The specific transgenic events embodied in these fish are designated the "Orange Cory 1 transformation event". Germ cells from these fish may be implanted into Cory eggs and thereby obtain transgenic Cory that comprises the specific transgenic integration events. Cryopreserved adult germ stem cells from this line was deposited at the ATCC, Historic District, 10801 University Blvd, Manassas, VA 20110, under the provisions of the Budapest Treaty as "Orange Cory 1" (the deposit was designated as accession no. PTA-127095).

The fluorescent transgenic fish have use as ornamental fish in the market. Stably expressing transgenic lines can be developed by breeding a transgenic individual with a wild-type fish, mutant fish, or another transgenic fish. The desired transgenic fish can be distinguished from non-transgenic fish by observing the fish in white light, sunlight, ultraviolet light, blue light, or any other useful lighting condition that allows visualization of the Orange color of the transgenic fish.

Example 3-Green Transgenic Cory

Transgenic fish exhibiting a Green color are provided. The specific transgenic events embodied in these fish are designated the "Green Cory 1 transformation event". Germ cells from these fish may be implanted into Cory eggs and thereby obtain transgenic Cory that comprises the specific transgenic integration events. Cryopreserved adult germ stem cells from this line was deposited at the ATCC, Historic District, 10801 University Blvd, Manassas, VA 20110, under the provisions of the Budapest Treaty as "Green Cory 1" (the deposit was designated as accession no. PTA-127096).

The fluorescent transgenic fish have use as ornamental fish in the market. Stably expressing transgenic lines can be developed by breeding a transgenic individual with a wild-type fish, mutant fish, or another transgenic fish. The desired transgenic fish can be distinguished from non-transgenic fish by observing the fish in white light, sunlight, ultraviolet light, blue light, or any other useful lighting condition that allows visualization of the Green color of the transgenic fish.

Example 4—Yellow Transgenic Cory

Transgenic fish exhibiting a yellow color are provided. The specific transgenic events embodied in these fish are designated the "Yellow Cory 1 transformation event". Transgenic fish exhibiting a yellow color are provided. The specific transgenic events embodied in these fish are designated Yellow Cory 1 transformation event. Adult germ stem cells from these fish can be obtained, for example, from the progeny of crossing a green fluorescent cory and an orange fluorescent cory. It should be appreciated that the ability to provide transgenic fish that display colors that comprise "color-crossed" combinations would not be readily apparent to one skilled in the art, nor is the ability to obtain a novel color readily obtained without undue experimentation. This is particularly evidence when desiring multiple generations of having consistent visualization of the Yellow Cory 1 transformation event. The Examples below show various related examples of Yellow cory that can be obtained.

In some example embodiments, an expression cassette encoding green fluorescent protein (GFP), such as zsGreen1, eYGFPdp, AausFP1, mNeonGreen, maxNeonGreen, mGreenLantern, Clover, mClover3, PlamGFP, aeurGFP, afraGFP, WasCFP, NowGFP, cerFP505, pporGFP, Kohinoor, efasGFP, eechGFP1, bfloGFPal, LanFP1 and LanFP2 and an expression cassette encoding for the yellow fluorescent protein (YFP), such as ZsYellow1, TurboYFP, E2-Orange, phiYFP, zFP538, Venus, yPet, ccalYFP1, mGold, Citrine, mCitrine, Topaz, mPapaya, and mBanana are injected, thereby encoding for both green and orange colors, but the Cory comprises a Yellow visualization effect.

In other embodiments, a specific transgenic integration event, a GFP and YFP Cory or progeny thereof is provided comprising chromosomally integrated transgenes that may be present on one integrated expression cassette for each fluorescent protein or two or more integrated expression cassettes for each fluorescent protein. In certain aspects, such a transgenic Cory is a fertile, transgenic Cory. Such a transgenic Cory may be homozygous or heterozygous (including, for example, hemizygous) for the transgenes or integrated expression cassette. In related embodiments the Yellow cory is formed from breeding a cory comprising a chromosomally integrated expression cassette encoding a green fluorescent protein with a cory comprising a chromosomally integrated expression cassette encoding yellow fluorescent protein. The progeny of such breeding results in a fertile next generation fish line. In some instances a sterile progeny line is desired and allows for the Yellow cory to be sourced from, for example, a specific generation line such as (F1, F2, F3, etc.).

The fluorescent transgenic fish have use as ornamental fish in the market. Stably expressing transgenic lines can be developed by breeding a transgenic individual with a wild-type fish, mutant fish, or another transgenic fish. The desired transgenic fish can be distinguished from non-transgenic fish by observing the fish in white light, sunlight, ultraviolet light, blue light, or any other useful lighting condition that allows visualization of the yellow color of the transgenic fish.

The fluorescent transgenic fish should also be valuable in the market for scientific research tools because they can be used for embryonic studies such as tracing cell lineage and cell migration. Additionally, these fish can be used to mark cells in genetic mosaic experiments and in fish cancer models.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents that are both chemically and physiologically related may be substituted for the agents described herein while the same or similar results would be achieved. All such similar substitutes and modifications apparent to those skilled in the art are deemed to be within the spirit, scope, and concept of the invention as defined by the appended claims.

The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. A transgenic Cory whose genome comprises:
(a) a chromosomally integrated expression cassette encoding a red fluorescent protein, wherein the integrated expression cassette encoding the red fluorescent protein is designated as the "Red Cory 1 transformation event" comprised in the germ stem cells deposited as

ATCC accession number PTA-127094, wherein the transgenic Cory exhibits red fluorescence, (b) a chromosomally integrated expression cassette encoding an orange fluorescent protein, wherein the integrated expression cassette encoding the orange fluorescent protein is designated as the "Orange Cory 1 transformation event" comprised in the germ stem cells deposited as ATCC accession number PTA-127095, wherein the transgenic Cory exhibits orange fluorescence, or (c) a chromosomally integrated expression cassette encoding a green fluorescent protein, wherein the integrated expression cassette encoding the green fluorescent protein is designated as the "Green Cory 1 transformation event" comprised in the germ stem cells deposited as ATCC accession number PTA-127096, wherein the transgenic Cory exhibits green fluorescence.

2. The transgenic Cory of claim 1, further defined as a fertile, transgenic Cory.

3. The transgenic Cory of claim 1, wherein the transgenic Cory is homozygous for the integrated expression cassette.

4. The transgenic Cory of claim 1, wherein the transgenic Cory is heterozygous for the integrated expression cassette.

5. A method of producing a transgenic Cory comprising:
(a) obtaining a transgenic Cory whose genome comprises:
(i) a chromosomally integrated expression cassette encoding a red fluorescent protein, wherein the integrated expression cassette encoding the red fluorescent protein is designated as the "Red Cory 1 transformation event" comprised in the germ stem cells deposited as ATCC accession number 127094, wherein the transgenic Cory exhibits red fluorescence,
(ii) a chromosomally integrated expression cassette encoding an orange fluorescent protein, wherein the integrated expression cassette encoding the orange fluorescent protein is designated as the "Orange Cory 1 transformation event" comprised in the germ stem cells deposited as ATCC accession number PTA-127095, wherein the transgenic Cory exhibits orange fluorescence, or
(iii) a chromosomally integrated expression cassette encoding a green fluorescent protein, wherein the integrated expression cassette encoding the green fluorescent protein is designated as the "Green Cory 1 transformation event" comprised in the germ stem cells deposited as ATCC accession number PTA-127096, wherein the transgenic Cory exhibits green fluorescence, and (b) breeding the obtained transgenic Cory from step (a) with a second Cory to provide:
(x) a transgenic Cory comprising the "Red Cory 1 transformation event" comprised in germ stem cell deposited as ATCC accession no. PTA-127094, wherein the transgenic Cory exhibits red fluorescence;
(y) a transgenic Cory comprising the "Orange Cory 1 transformation event" comprised in germ stem cell deposited as ATCC accession no. PTA-127095, wherein the transgenic Cory exhibits orange fluorescence; or
(z) a transgenic Cory comprising the "Green Cory 1 transformation event" comprised in germ stem cell deposited as ATCC accession no. PTA-127096, wherein the transgenic Cory exhibits green fluorescence.

6. The method of claim 5, wherein the second Cory is a non-transgenic Cory.

\* \* \* \* \*